(12) United States Patent
Jahn

(10) Patent No.: US 10,837,930 B2
(45) Date of Patent: Nov. 17, 2020

(54) PROBE FOR DETERMINING HUMIDITY

(71) Applicant: E+E Elektronik Ges.m.b.H., Engerwitzdorf (AT)

(72) Inventor: Karl Jahn, Gunskirchen (AT)

(73) Assignee: E+E ELEKTRONIK GES.M.B.H., Engerwitzdorf (AT)

( * ) Notice: Subject to any disclaimer, the term of this patent is extended or adjusted under 35 U.S.C. 154(b) by 232 days.

(21) Appl. No.: 16/121,671

(22) Filed: Sep. 5, 2018

(65) Prior Publication Data

US 2019/0072507 A1 Mar. 7, 2019

(30) Foreign Application Priority Data

Sep. 7, 2017 (EP) ..................... 17189901

(51) Int. Cl.
*G01N 25/66* (2006.01)
*G01N 25/00* (2006.01)
*G01K 1/16* (2006.01)
*G01K 17/08* (2006.01)
*G01S 13/95* (2006.01)

(52) U.S. Cl.
CPC .............. *G01N 25/66* (2013.01); *G01K 1/16* (2013.01); *G01K 17/08* (2013.01); *G01N 25/00* (2013.01); *G01S 13/95* (2013.01)

(58) Field of Classification Search
CPC .......... G01K 17/08; G01K 1/16; G01N 25/00; G01N 25/66; G01S 13/95
See application file for complete search history.

(56) References Cited

U.S. PATENT DOCUMENTS

| 6,276,202 B1 | 8/2001 | Latarius | |
| 7,891,572 B1 * | 2/2011 | Murray | F24D 19/1009 236/21 R |
| 8,311,765 B2 * | 11/2012 | Nielsen | G01V 3/38 702/130 |
| 2004/0227636 A1 * | 11/2004 | Gul | G01K 1/08 340/620 |
| 2008/0259993 A1 * | 10/2008 | Blakeley | G01J 5/04 374/121 |

(Continued)

FOREIGN PATENT DOCUMENTS

| DE | 102011111959 A1 | 2/2013 |
| EP | 0970457 A1 | 1/2000 |
| WO | WO 9841958 A1 | 9/1998 |

*Primary Examiner* — Francis C Gray
(74) *Attorney, Agent, or Firm* — Leydig, Voit & Mayer Ltd.

(57) ABSTRACT

A probe includes a base extending lengthwise between a proximal end and a distal end of the probe. A humidity sensor configured to measure a humidity value is disposed at the distal end. A temperature sensor configured to measure a temperature value has an ambient temperature sensing element that is spaced apart from the humidity sensor by a portion of the base and is disposed between the proximal end and the distal end. An interface disposed at the proximal end is configured to output a data signal indicative of humidity and to receive a power signal for heating the humidity sensor. Electronics is disposed on the base past the interface in a direction away from the proximal end and is coupled to the temperature and humidity sensors. The electronics is configured to provide the data signal to the interface as a function of the temperature humidity values.

28 Claims, 4 Drawing Sheets

(56) References Cited

U.S. PATENT DOCUMENTS

| | | | |
|---|---|---|---|
| 2009/0141767 A1* | 6/2009 | Cummins | G01N 27/223 374/142 |
| 2016/0034907 A1* | 2/2016 | Worrall | G06Q 30/018 705/317 |
| 2018/0238746 A1* | 8/2018 | Quant | G01P 5/12 |

* cited by examiner

PROBE FOR DETERMINING HUMIDITY

CROSS-REFERENCE TO PRIOR APPLICATION

Priority is claimed to European Patent Application No. EP 17189901.6, filed on Sep. 7, 2017, the entire disclosure of which is hereby incorporated by reference herein.

FIELD

The present invention relates to a probe for determining humidity, for example, for purposes of meteorological data acquisition.

BACKGROUND

It is known from the prior art to bring a humidity sensor of a probe for determining the humidity of ambient air to a temperature above the ambient temperature. This makes it possible to reduce the relative humidity at the measurement point, and thus the risk of dew formation, which could corrupt the measurement. Then, this excess temperature can be determined by a separate temperature sensing element of the humidity sensor. Based on the excess temperature and the humidity level determined by a humidity sensing element of the humidity sensor, it is possible to determine, for example, the water vapor partial pressure.

An example of such a humidity sensor for a probe is known from the data sheet for the devices of the type "EE33" of the E+E ELEKTRONIK company, which is available via the URL http://downloads.epluse.com/fileadmin/data/product/ee33/Datenblatt_EE33.pdf.

Moreover, the temperature sensing element and the temperature sensing element in the humidity sensor of the probe may be monolithically integrated as described, for example, in the data sheet for the device of the type "HMC01" of the E+E ELEKTRONIK company, which is available via the URL http://downloads.epluse.com/fileadmin/data/product/ee33/HMC01_deutsch.pdf.

For the final calculation of the actual humidity of the environment, it may be useful to measure not only the temperature at the humidity sensing element, but in addition also the actual ambient temperature; i.e., the temperature in the environment whose humidity level is to be determined. To this end, an ambient temperature sensor is provided in addition to humidity sensor and measures the ambient temperature with as little influence as possible from the increased temperature at the humidity sensing element.

In this connection, it is known that, in a probe, the humidity sensor and the temperature sensor for measuring the ambient temperature are each accommodated in a separate housing and, therefore, may be positioned separately from one another. Such an approach is described, for example, in the user's guide for the device of the type "HMP155" of the VAISALA Oyj company, which is available via the URL http://www.vaisala.com/Vaisala%20Documents/User%20Guides%20and%20Quick%20Ref%20Guides/HMP155_User_Guide_in_English.pdf. This distributed arrangement of a probe allows the ambient temperature to be determined relatively accurately; however, the installation of the probe is cumbersome due to the two separate housings.

A probe where the humidity sensor and the temperature sensor for measuring the ambient temperature are mounted to a common base is described in the data sheet for the device of the type "HygroMet4" of the ROTRONIC company, which is available via the URL https://www.rotronic.com/en/productattachments/index/download?id=929.

SUMMARY

In an embodiment, the present invention provides a probe including a base extending lengthwise between a proximal end and a distal end of the probe. A humidity sensor configured to measure a humidity value is disposed at the distal end of the probe. A temperature sensor configured to measure a temperature value has an ambient temperature sensing element that is spaced apart from the humidity sensor by a portion of the base and is disposed between the proximal end and the distal end of the probe. An interface disposed at the proximal end of the probe is configured to output a data signal indicative of humidity and to receive a power signal for heating the humidity sensor. Electronics is disposed on the base past the interface in a direction away from the proximal end of the probe and is coupled to the temperature sensor and the humidity sensor. The electronics is configured to provide the data signal to the interface as a function of the temperature value and the humidity value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
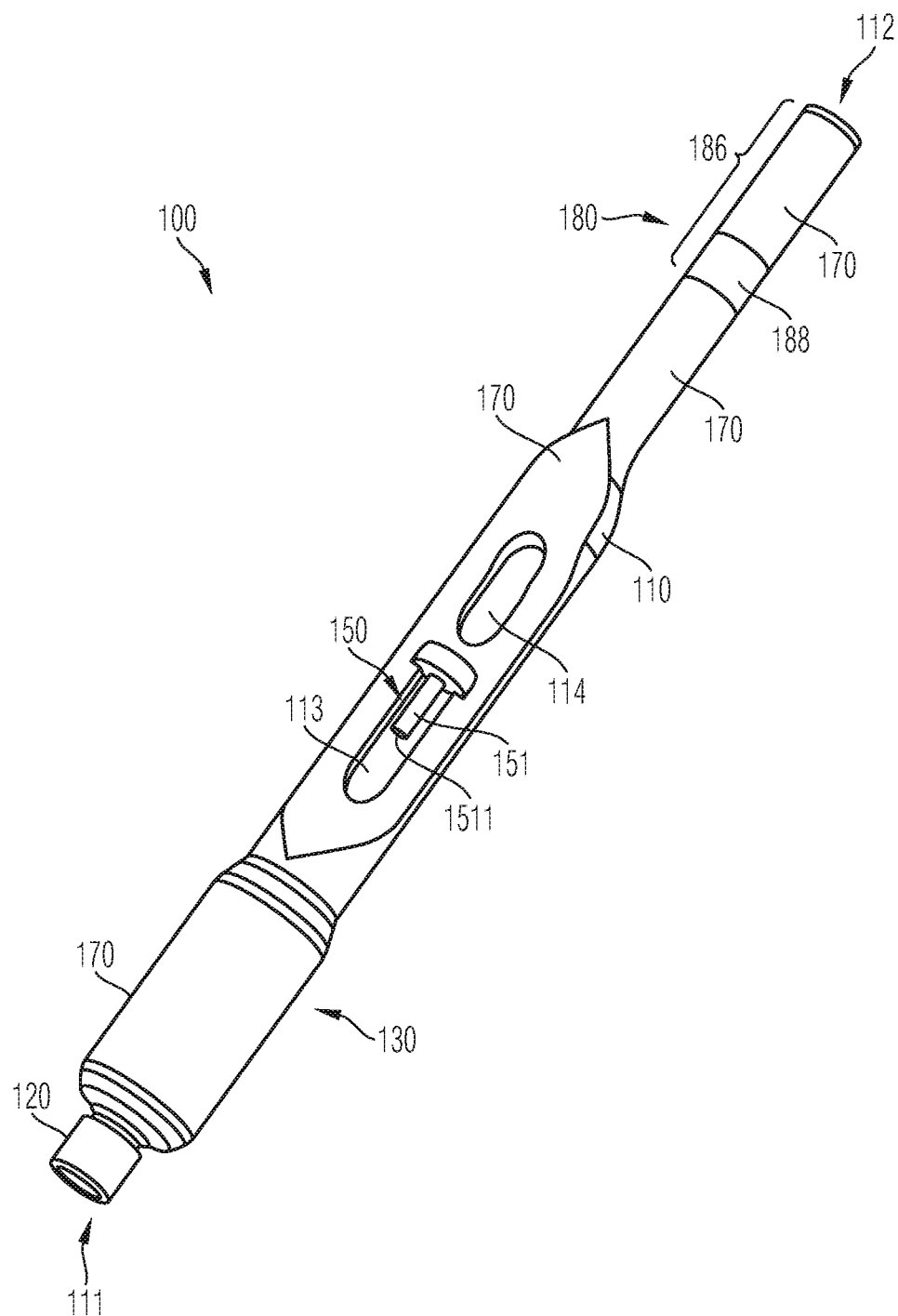
FIG. 1 is an exemplary schematic perspective view of a probe according to one or more embodiments.

The inventor has recognized that the last-mentioned "HygroMet4" device is problematic in that the temperature sensor for measuring the ambient temperature forms the distal end of the probe and, therefore, can be damaged relatively easily. Moreover, the temperature sensor is located in the immediate vicinity of the humidity sensor, and therefore the temperature determined by the temperature sensor may, under certain circumstances, be affected by excess temperature at the humidity sensor.

In an embodiment, the present invention provides a probe which, on the one hand, has a compact design and, on the other hand, enables accurate determination of the humidity.

According to an embodiment, the present invention provides a probe having a temperature sensor for measuring a temperature value and a humidity sensor for measuring a humidity value.

The probe includes a base extending lengthwise between a proximal end and a distal end of the probe. At the proximal end, there is disposed an interface that is configured to output a data signal indicative of humidity. The interface is further configured to receive a power signal for heating the humidity sensor.

Also provided in the probe is electronics, which is disposed on the base past the interface in a direction away from the proximal end of the probe and coupled to both the temperature sensor and the humidity sensor. The electronics is configured to provide the data signal as a function of the measured temperature value and the measured humidity value.

The humidity sensor is disposed at the distal end. The humidity sensor may also form the distal end of the probe.

The temperature sensor includes an ambient temperature sensing element that is spaced apart from the humidity sensor by a portion of the base and is disposed between the proximal end and the distal end. Thus, for example, the humidity sensor forms the distal end of the probe, and the temperature sensor may be mounted to the base approximately centrally, for example. Furthermore, the ambient temperature sensing element of the temperature sensor may also be spaced apart from the electronics by a further portion of the base.

The arrangement of the humidity sensor and the temperature sensor enables accurate determination of humidity and also easy installation of the probe in an application, while at the same time making it possible to protect the temperature sensor from external influence. In addition, due to the distance between the humidity sensor and the temperature sensor, the probe can be calibrated in an advantageous manner.

For example, the ambient temperature sensing element includes a tip that does not point toward the humidity sensor, but toward the proximal end of the probe; i.e., away from the humidity sensor, which may be heated.

In an embodiment, the base has a first opening framing the ambient temperature sensing element. The base may take the form of a circuit board (printed circuit board, PCB), in which an opening is milled or punched, the ambient temperature sensing element being placed in this opening. In this way, the ambient temperature sensing element is protected by the base from external influences.

The base may have an isolation structure disposed between the humidity sensor and the temperature sensor. Thus, the temperature sensor is not disposed immediately adjacent to the humidity sensor, but spaced therefrom by a portion of the base, namely the isolation structure. The isolation structure may have a locally reduced thermal conductivity. Such reduction in thermal conductivity may be implemented in different ways, such as by selecting suitable materials and/or by the geometric design. The same may apply analogously to that portion of the base which establishes the distance between the ambient temperature sensing element and the electronics.

It is within the scope of embodiments of the invention, for example, that the isolation structure includes or is formed by a second opening of the base. This second opening may be positioned, for example, between the distal end and the first opening, which frames the ambient temperature sensing element. For example, this second opening has a length of at least 5 mm (along the longitudinal extent of the base) and/or a width of at least 40% of the width of the base. It is also possible to select a greater width and/or length, which would result in a correspondingly greater thermal isolation between the humidity sensor at the distal end and the location of the ambient temperature sensing element, as long as the mechanical stability of the probe is not jeopardized.

The humidity sensor of the probe may include a separate or additional heating element which is also disposed at the distal end. The humidity sensor may be equipped with a humidity sensing element and a temperature sensing element, which may be implemented, for example, as described in the above-mentioned data sheet for the device of the type "HMC01." In an embodiment of the probe, the humidity sensor is configured exactly as described in this data sheet. The humidity sensing element and the temperature sensing element may be accommodated in a heatable humidity chamber of the humidity sensor (the heating being provided by the above-mentioned heating element, for example). This humidity chamber or an end sleeve spatially bounding the same may form the distal end of the probe. In addition to the separate heating element, heating of the humidity sensor may also be accomplished by an increased measurement current of the temperature sensing element; i.e., the power dissipation thereof. The electronics may be configured to suitably adjust the temperature at the humidity sensor.

Except for the interface, the components of the probe may be integrated within a common housing, which may include, for example, an injection-molded part. In particular, the housing may accommodate both the humidity chamber of the humidity sensor and the electronics.

The above-described first opening of the base may be reproduced by the housing as well, so that a corresponding opening of the housing frames the ambient temperature sensing element.

In an embodiment of the probe, the data signal generated by the electronics of the probe and output by the interface may indicate the relative humidity and optionally also the temperature of the environment.

The probe may be designed for a variety of different applications where it is important to determine humidity as accurately as possible. One possible application is, in particular, meteorological data acquisition. In another embodiment, the probe is, for example, designed for permanent installation in an air-conditioning system, for example in an air-conditioning system of a vehicle. Other fields of application include the pharmaceutical and food industries, mushroom farms, controlled humidity warehouses, climate-controlled chambers, test chambers and aging chambers, meteorology, as well as the drying of objects, such as the drying of ceramics, wood, concrete and/or polyester.

FIG. 1 shows schematically and exemplarily a perspective view of a probe 100. Probe 100 includes a temperature sensor 150 for measuring a temperature value (in particular, an ambient temperature value) as well as humidity sensor 180 for measuring a humidity value.

Probe 100 is based on a base 110 extending lengthwise between a proximal end 111 and a distal end 112 of probe 100. Base 100 may have an elongated extent at least twice as great as its average width.

In an embodiment such as schematically shown in FIG. 2A, base 110 includes a circuit board, for example, a PCB board. Base 110 may also be in the form of a circuit board. The circuit board may be populated with components of probe 100.

At proximal end 111, there is disposed an interface 120 that is configured to output a data signal indicative of humidity. In the present exemplary embodiment, interface 120 is mounted to base 110 and includes a connector via which the data signal is output to a data bus. Alternatively, the data signal may also be output wirelessly as a radio signal via interface 120.

Interface 120 may be compatible with a serial data transmission standard such as, for example, the EIA-485 standard. At the same time, interface 120 may also be designed for mechanical attachment of probe 100, for example, by screwing the connector onto or into a thread. Interface 120 forms the transition between base 110 and a coupling point of the application in which probe 100 may be installed.

Moreover, probe 100 may receive, via interface 120, a power signal for heating humidity sensor 180. The power signal is, for example, a current or voltage signal.

Electronics 130 (schematically shown in FIG. 2A) is mounted to base 110 downstream of interface 120 (in a direction away from the proximal end 111). Electronics 130 includes, for example, an analysis unit which receives the temperature value measured by temperature sensor 150 and the humidity value measured by humidity sensor 180 and which, based on these values, calculates the data signal that indicates the humidity (and optionally also the ambient temperature), makes this data signal available and outputs it via interface 120.

In addition to the analysis unit, electronics 130 may also include passive components and/or power electronic components and may be configured, for example, to receive the power signal via such components, to process it for purposes of heating humidity sensor 180, and to pass it on to humidity sensor 180.

Base 110, which may, for example, be in the form of said circuit board, includes suitable leads, cables and/or integrated conductive traces for transmitting the power signal, or the signal derived therefrom, and for transmitting the measured temperature and humidity values.

As illustrated in all of FIGS. 1 through 4, humidity sensor 180 is disposed at distal end 112 of probe 100. Thus, in the exemplary embodiment shown, humidity sensor 180 forms the distal end 112 of probe 100, as will be explained below in more detail with reference to FIGS. 2A through 4.

In the present case, the end of base 110 pointing toward distal end 112 is provided with two pins 1171 and 1172, which extend beyond this end of base 110 and have a carrier 1800 (see FIG. 3) attached thereto, e.g., by soldering. However, it is also possible to provide a plurality of pins or only one pin instead of the illustrated pins 1171, 1172. Similarly, in another embodiment of the probe, an alternative coupling means may be used instead of pins 1171, 1172. However, for purposes of illustration, the following will always refer to "pins 1171, 1172."

A humidity sensing element 181 and a temperature sensing element 182 are arranged on a carrier 1800, for example, in a manner as described in the above-cited data sheet for the device of the type "HMC01" of the E+E ELEKTRONIK company. For exemplary details of this possible embodiment of humidity sensor 180, reference is made in this context also to this data sheet.

Figure 4:
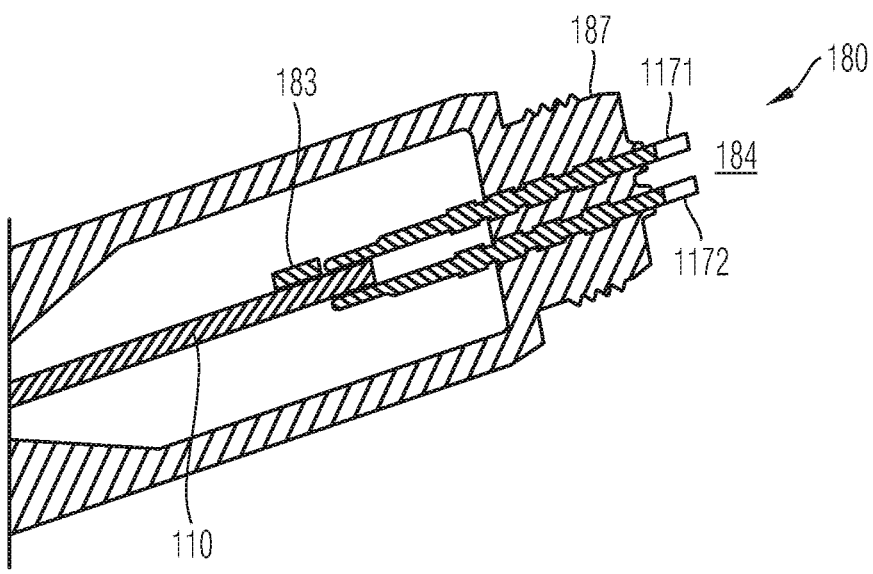
FIG. 4 is an exemplary schematic cross-sectional view of a portion of a humidity sensor of a probe according to one or more embodiments.

Carrier 1800 is made, for example, of a glass substrate that carries temperature sensing element 182 and humidity sensing element 181, which is located thereabove. Heating of carrier 1800 may be accomplished here, on the one hand, by suitably increasing the measurement current of temperature sensing element 182 and utilizing the resulting power dissipation as heating power. On the other hand, it is possible, for example, to additionally heat humidity sensor 180 by means of a heating element 183 at the end of base 110. This heating element 183 may be in the form of a heating resistor disposed on base 110. At least one of the two pins 1171 and 1172 may then function as a heat conductor through which the heat generated by additional heating element 183 is supplied to carrier 1800. One of the two pins 1171, 1172 may be mounted, for example, to a top side of base 110, and the other may be mounted to an underside of base 110, as illustrated in FIG. 4.

In particular, this can allow the assembly including humidity sensing element 181 and temperature sensing element 182 to be subjected to a temperature above the ambient temperature of probe 100. Electronics 130 may be configured, in particular, to suitably adjust the temperature at humidity sensor 180, for example, at carrier 1800, using heating element 183 and the measurement current of temperature sensing element 182. Probe 100 is configured, for example, to prevent the formation of dew on humidity sensor 180 and false readings associated therewith through heating. Such dew formation could occur in the absence of heating, especially in an environment with high air humidity, for example.

The sensor signals from humidity sensing element 181 and temperature sensing element 182 are fed to electronics 130, in particular to the analysis unit of electronics 130, for further processing. To this end, in addition to the two pins 1171, 1172, leads and/or conductive traces may be provided on or in base 110.

In the exemplary embodiment shown, humidity sensor 180 further has an end sleeve 186 that can be placed over the assembly including humidity sensing element 181 and temperature sensing element 182 and connected to the remainder of probe 100, for example by means of a thread system 187, 188. In this way, a humidity chamber 184 of humidity sensor 180 can be formed by end sleeve 186. This end sleeve 186 may at the same time form part of a housing 170 which seals probe 100, and in particular may form distal end 112 of probe 100.

Figure 2:
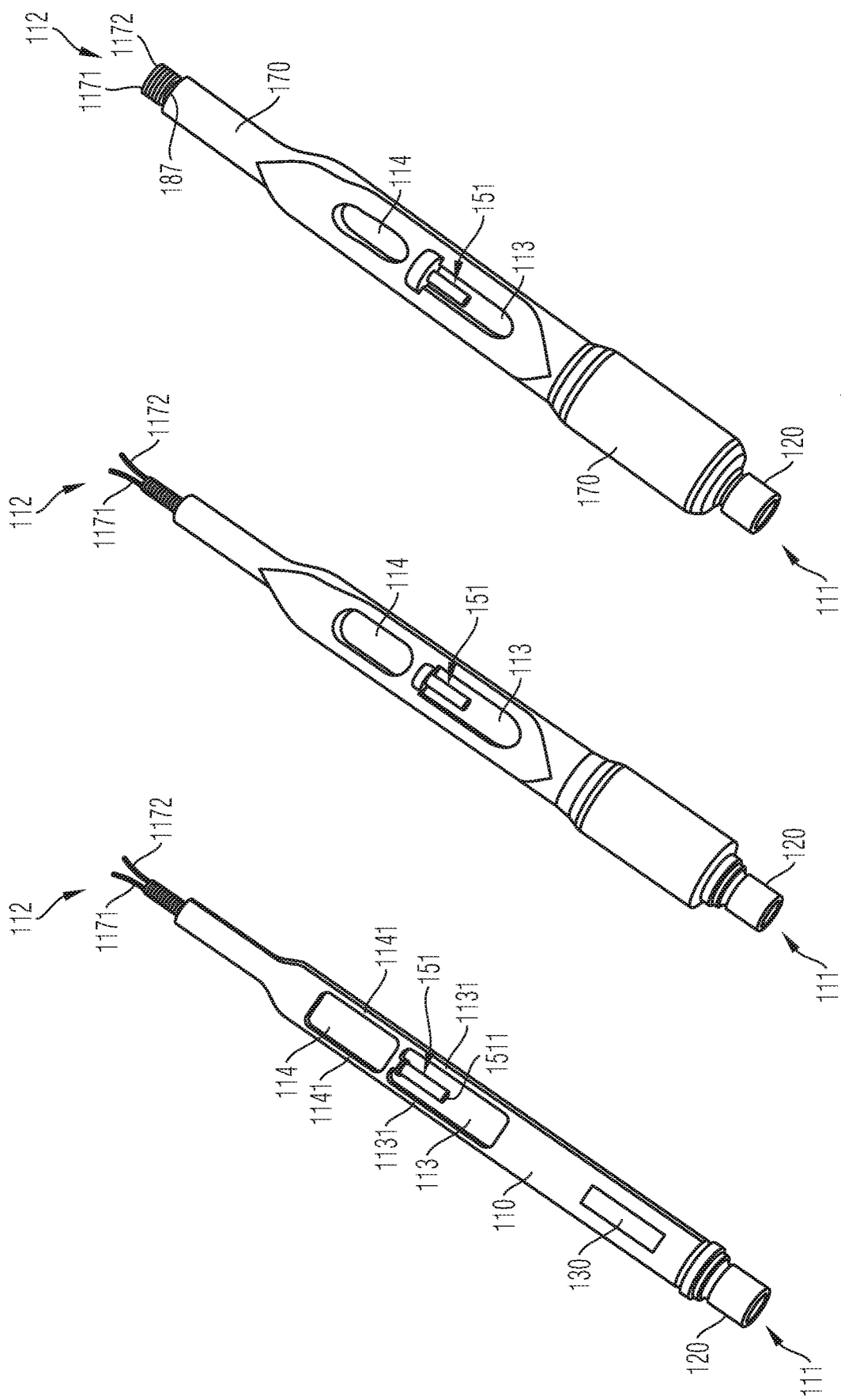
FIGS. 2A-C are exemplary schematic perspective views showing a portion of a probe according to one or more embodiments.
Figure 3:
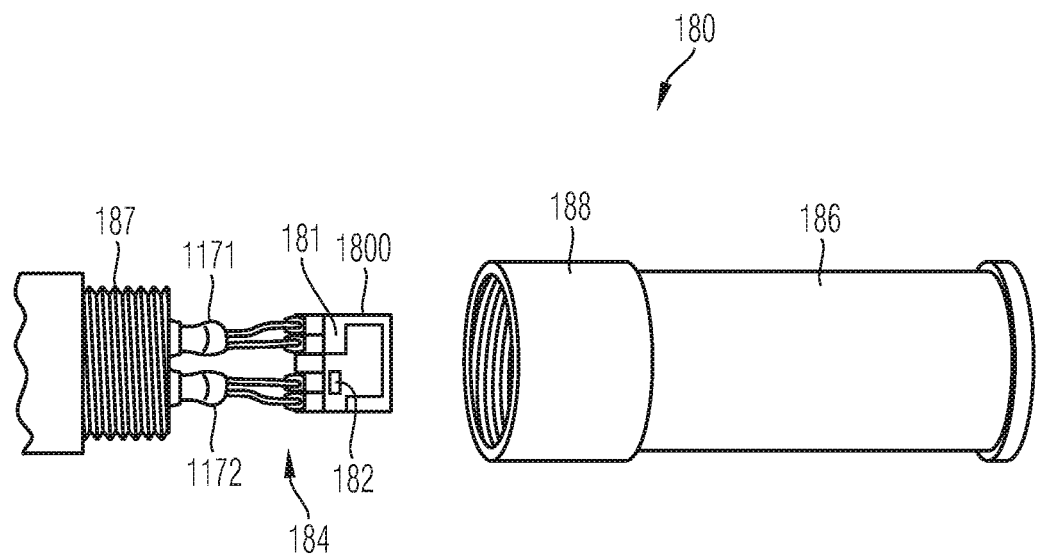
FIG. 3 is an exemplary schematic plan view illustrating a portion of a humidity sensor of a probe according to one or more embodiments.

Temperature sensor 150, which is used to measure the ambient temperature and therefore includes a ambient temperature sensing element 151, is not disposed at distal end 112. Rather, ambient temperature sensing element 151 is spaced apart from humidity sensor 180 by a portion of base 110 and disposed between proximal end 111 and distal end 112, for example, approximately in the middle of the base, as illustrated in FIGS. 1 through 2C. In addition, ambient temperature sensing element 151 may also be spaced apart from electronics 130 by a further portion of base 110.

In the present exemplary embodiment, electronics 130 is provided between proximal end 11 and ambient temperature sensing element 151.

Because temperature sensor 150 is disposed spaced apart from heated humidity sensor 180, ambient temperature sensing element 151 is thermally isolated from heated humidity sensor 180, so that the ambient temperature can be accurately measured.

In the present exemplary embodiment, the measurement signal of ambient temperature sensing element 151 is also fed to electronics 130, in particular to the analysis unit of electronics 130, which, based on the measurement signal of ambient temperature sensing element 151, the measurement signal of temperature sensing element 182 of humidity sensor 180, and based on the measurement signal of humidity sensing element 181 of humidity sensor 180, can calculate the data signal that indicates the humidity of the environment of probe 100, make it available and output it via interface 120.

Thermal isolation can be further enhanced by a tip 1511 of ambient temperature sensing element 151 which is arranged such that it points toward proximal end 111; i.e., away from distal end 112, where humidity sensor 180 is disposed. Thus, the location where the actual ambient temperature is measured is relatively far away from the humidity measurement location, which may be heated, as mentioned earlier.

In the example shown, base 110 has a first opening 113 that frames ambient temperature sensing element 151, as illustrated in FIG. 2A. In a possible embodiment, the arrangement of ambient temperature sensing element 151 and first opening 113 is selected such that a minimum distance is also observed between electronics 130 and ambient temperature sensing element 151. This minimum distance may be established by another portion of base 110. This is because electronics 130 may also give off heat which could corrupt the measurement of the ambient temperature.

Figure 5:
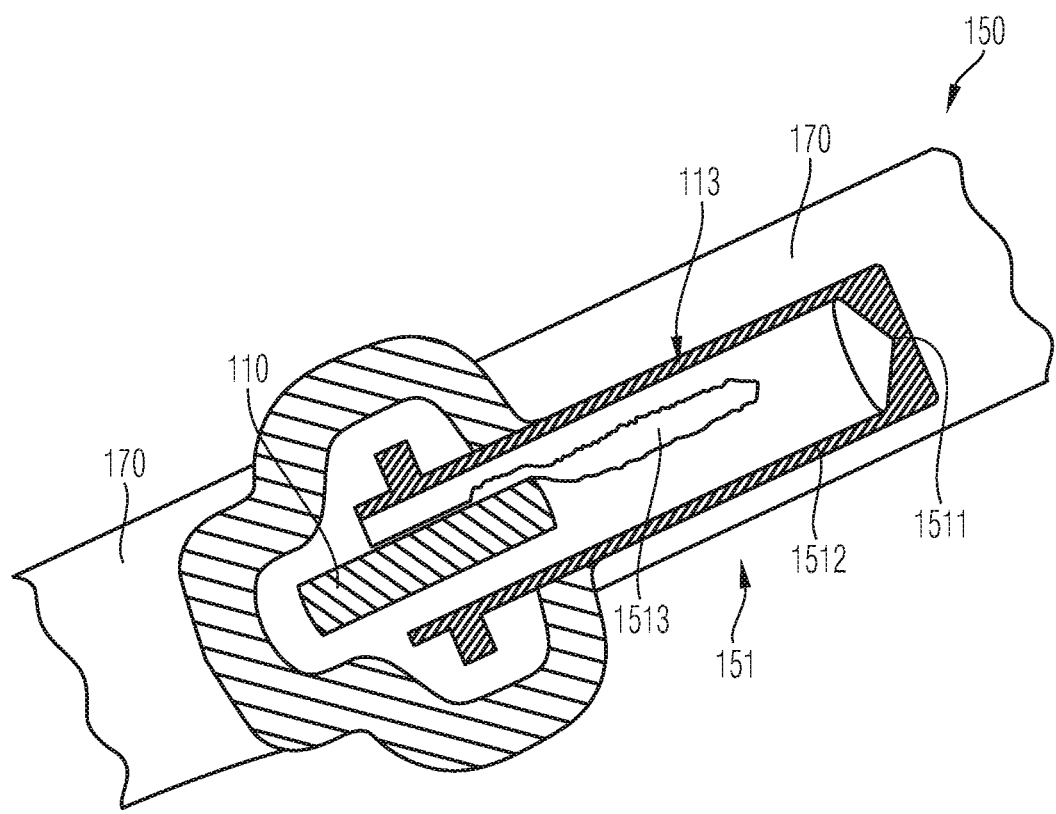
FIG. 5 is an exemplary schematic cross-sectional view of a temperature sensor of a probe according to one or more embodiments.

An exemplary embodiment of temperature sensor 150 is shown in cross-sectional view in FIG. 5. This temperature sensor 150 includes, for example, ambient temperature sensing element 151, which has a sensor element 1513, in the form of, for example, a resistive temperature sensor (e.g., a PT100 sensor element, a PT1000 sensor element, an NTC sensor element, or a PTC sensor element), which is disposed in a sleeve 1512, such as a metal sleeve 1512. Tip 1511 of sleeve 1512 points toward proximal end 111 (and not toward humidity sensor 180, which is located at or forms distal end 112). Sensor element 1513 is, for example, soldered to base 110, and sleeve 1512 partially extends beyond the respective portion of base 110, as exemplarily illustrated in FIG. 5. Sleeve 1512 accommodating sensor element 1513 is disposed in first opening 113, and thus protected by the portions of housing 170 that define opening 113. Moreover, the interior of sleeve 1512 may be filled with a material having a high thermal conductivity, thereby ensuring a good thermal connection between the outer wall of sleeve 1512 and sensor element 1513 located inside thereof.

Thermal isolation between temperature sensor 150 and humidity sensor 180 of probe 100 may be accomplished not only by spacing them apart, but also by adapting base 110 in terms of material and/or structure.

For example, base 110 may have an isolation structure between humidity sensor 180 and temperature sensor 150, the isolation structure having a locally reduced thermal conductivity, for example.

The reduction in thermal conductivity may be implemented, for example, by providing suitable materials in base 110.

Alternatively or additionally, base 110 may also be structurally modified in the relevant portion thereof, as schematically illustrated in FIG. 2A. There, base 110 has a second opening 114 that constitutes or forms part of the isolation structure. Second opening 114 is provided between distal end 112 and first opening 113, which frames ambient temperature sensing element 151. For example, this opening has a length of at least 5 mm and/or a width of at least 40% of the width of base 110. Second opening 114 may also be sized larger than these exemplarily mentioned dimensions to provide even greater thermal isolation between humidity sensor 180 and temperature sensor 150, as long as the mechanical stability of probe 100 is ensured.

Both openings 113 and 114 are laterally bounded by respective connecting webs 1131 and 1141, which may each be relatively narrow (in relation to the width of the base), and thus have a low thermal conductivity. This also makes it possible to ensure thermal isolation between ambient temperature sensing element 115 and electronics 130 on the one hand, and humidity sensor 180 on the other hand.

The above explanations were given with particular regard to the thermal isolation between temperature sensor 150 and humidity sensor 180. It is understood, however, that the same or similar measures may be taken to thermally isolate temperature sensor 150 from electronics 130.

With regard to a possible variant for the manufacture of probe 100, reference is made below to FIGS. 2A-C. In the present example, initially, base 110 is provided in the form of a circuit board that is populated with the components required for measurement purposes. These include, for example, electronics 130, ambient temperature sensing element 151, as well as interface 120 at one end and, at the other end, pins 1171, 1172 leading to the humidity sensor 180 to be installed later. The circuit board is further formed with first opening 113 and second opening 114, which are, for example, punched or milled into the circuit board.

After being populated in accordance with requirements, base 110 is then overmolded with a protective material, beginning at interface 120 and proceeding toward the two pins 1171 and 1172 using, for example, a method known as hot-melt molding, as illustrated in FIG. 2B.

This product is then subjected to a plastic overmolding process in which it is overmolded, for example, with a thermoplastic material as illustrated in FIG. 2C. Prior or subsequent to this, a threaded part 187 may be provided at the end of base 110, which threaded part is adapted to receive a corresponding counterpart 188 of end sleeve 186 (see FIG. 3) of humidity sensor 180.

Again referring to FIG. 1, probe 100 may thus have a housing 170 that surrounds base 110 and seals the entire probe 100 and, in particular, accommodates both electronics 130 and heatable humidity chamber 184 of humidity sensor 180. In accordance with the foregoing, housing 170 may include an injection-molded plastic part.

For example, housing 170 is formed of two pieces, namely a first monolithic piece completely enclosing base 110, for example as exemplarily illustrated in FIG. 2C, and a second monolithic piece formed by end sleeve 186. End sleeve 186 may also be manufactured as an injection-molded plastic part.

The probe 100 illustrated in the figures may be designed for a variety of different applications where it is important to determine humidity as accurately as possible.

Probe 100 is, for example, designed for permanent installation in an air-conditioning system, for example in an air-conditioning system of a vehicle. Other fields of application include the pharmaceutical and food industries, mushroom farms, controlled humidity warehouses, climate-controlled chambers, test chambers and aging chambers, meteorology, as well as the drying of objects, such as the drying of ceramics, wood, concrete and/or polyester.

For example, probe 100 has an overall length of about 250 mm and an average diameter of about 24 mm. Because of interface 120 and end sleeve 186, the overall length of base 110 is, for example, 50 mm less than the overall length of probe 100.

The proposed construction of probe 100 provides a multitude of advantages: first of all, temperature sensor 150 and humidity sensor 180 are coupled to the same base 110, and thus need not be positioned separately from one another. Nevertheless, thermal isolation between temperature sensor 150 and heatable humidity sensor 180 is ensured, for example, by the isolation structure including second opening 114. Because ambient temperature sensing element 151 is disposed within first opening 113, it is mechanically protected from external influence. Moreover, the proposed arrangement of temperature sensor 150 and humidity sensor 180 allows probe 100 to be calibrated in an advantageous manner. For example, during calibration of probe 100, distal end 112 of probe 100, which is formed by end sleeve 186, is introduced into a humidity calibration reactor, so that humidity sensor 180 can be calibrated in an isolated manner. Temperature sensor 150 can be calibrated separately. Furthermore, the above described first opening 113, which frames ambient temperature sensing element 151, may be dimensioned such that tip 1511 of ambient temperature sensing element 151 is sufficiently spaced (e.g., by at least 5 mm) from electronics 130, which is located, for example, at proximal end 111 and may also emit at least some heat. In addition, the construction permits easy cleaning of probe 100 during or after field operation.

The data signal output via interface 120 may be indicative, in particular, of the relative humidity in the environment of probe 100. Furthermore, electronics 130 may be configured to output the measurement signal of temperature sensor 150 as a further, separate data signal via interface 120.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A probe comprising:
   a base extending lengthwise between a proximal end and a distal end of the probe;
   a humidity sensor configured to measure a humidity value disposed at the distal end of the probe;
   a temperature sensor configured to measure a temperature value, the temperature sensor having an ambient temperature sensing element that is spaced apart from the humidity sensor by a portion of the base and is disposed between the proximal end and the distal end of the probe;
   an interface disposed at the proximal end of the probe and configured to output a data signal indicative of humidity and to receive a power signal for heating the humidity sensor; and
   electronics disposed on the base past the interface in a direction away from the proximal end of the probe and coupled to the temperature sensor and the humidity sensor, the electronics being configured to provide the data signal to the interface as a function of the temperature value and the humidity value,
   wherein the humidity sensor includes a heating element which is disposed at the distal end of the probe.

2. The probe as recited in claim 1, wherein the ambient temperature sensing element includes a tip that points toward the proximal end of the probe.

3. The probe as recited in claim 1, wherein the base has a first opening that frames the ambient temperature sensing element.

4. The probe as recited in claim 1, wherein the ambient temperature sensing element is spaced apart from the electronics by a further portion of the base.

5. The probe as recited in claim 1, wherein the base has an isolation structure disposed between the humidity sensor and the temperature sensor.

6. The probe as recited in claim 5, wherein the isolation structure has a locally reduced thermal conductivity.

7. The probe as recited in claim 5, wherein the isolation structure includes a second opening of the base.

8. The probe as recited in claim 7, wherein the second opening has a length of at least 5 mm.

9. The probe as recited in claim 7, wherein the second opening has a width of at least 40% of a width of the base.

10. The probe as recited in claim 1, wherein the electronics is configured to adjust the temperature at the humidity sensor.

11. The probe as recited in claim 1, wherein the humidity sensor includes a humidity sensing element and a temperature sensing element.

12. The probe as recited in claim 1, further comprising a housing that surrounds the base and accommodates the electronics and a heatable humidity chamber of the humidity sensor.

13. The probe as recited in claim 12, wherein the housing comprises an injection-molded plastic part.

14. The probe as recited in claim 1, wherein the probe is configured to be permanently installed in an air-conditioning system.

15. A probe comprising:
   a base extending lengthwise between a proximal end and a distal end of the probe;
   a humidity sensor configured to measure a humidity value disposed at the distal end of the probe;
   a temperature sensor configured to measure a temperature value, the temperature sensor having an ambient temperature sensing element that is spaced apart from the humidity sensor by a portion of the base and is disposed between the proximal end and the distal end of the probe;
   an interface disposed at the proximal end of the probe and configured to output a data signal indicative of humidity and to receive a power signal for heating the humidity sensor; and
   electronics disposed on the base past the interface in a direction away from the proximal end of the probe and coupled to the temperature sensor and the humidity sensor, the electronics being configured to provide the data signal to the interface as a function of the temperature value and the humidity value,
   wherein the electronics is configured to adjust the temperature at the humidity sensor.

16. The probe as recited in claim 15, wherein the ambient temperature sensing element includes a tip that points toward the proximal end of the probe.

17. The probe as recited in claim 15, wherein the base has a first opening that frames the ambient temperature sensing element.

18. The probe as recited in claim 15, wherein the ambient temperature sensing element is spaced apart from the electronics by a further portion of the base.

19. The probe as recited in claim 15, wherein the base has an isolation structure disposed between the humidity sensor and the temperature sensor.

20. The probe as recited in claim 19, wherein the isolation structure has a locally reduced thermal conductivity.

21. The probe as recited in claim 19, wherein the isolation structure includes a second opening of the base.

22. The probe as recited in claim 21, wherein the second opening has a length of at least 5 mm.

23. The probe as recited in claim 21, wherein the second opening has a width of at least 40% of a width of the base.

24. The probe as recited in claim 15, wherein the humidity sensor includes a humidity sensing element and a temperature sensing element.

25. The probe as recited in claim 15, further comprising a housing that surrounds the base and accommodates the electronics and a heatable humidity chamber of the humidity sensor.

26. The probe as recited in claim 25, wherein the housing comprises an injection-molded plastic part.

27. The probe as recited in claim 15, wherein the probe is configured to be permanently installed in an air-conditioning system.

28. A probe comprising:
a base extending lengthwise between a proximal end and a distal end of the probe;
a humidity sensor configured to measure a humidity value disposed at the distal end of the probe;
a temperature sensor configured to measure a temperature value, the temperature sensor having an ambient temperature sensing element that is spaced apart from the humidity sensor by a portion of the base and is disposed between the proximal end and the distal end of the probe;
an interface disposed at the proximal end of the probe and configured to output a data signal indicative of humidity and to receive a power signal for heating the humidity sensor; and
electronics disposed on the base past the interface in a direction away from the proximal end of the probe and coupled to the temperature sensor and the humidity sensor, the electronics being configured to provide the data signal to the interface as a function of the temperature value and the humidity value,
wherein the ambient temperature sensing element includes a tip that points toward the proximal end of the probe.

* * * * *